(12) United States Patent
Durand et al.

(10) Patent No.: US 11,485,079 B2
(45) Date of Patent: Nov. 1, 2022

(54) SYSTEM FOR LEVELING HEATED PLATEN IN 3D PRINTER

(71) Applicant: Stratasys, Inc., Eden Prairie, MN (US)

(72) Inventors: Josh Durand, Shakopee, MN (US); Jeff Lee Chapman, New Prague, MN (US)

(73) Assignee: Stratasys, Inc., Eden Prairie, MN (US)

( * ) Notice: Subject to any disclaimer, the term of this patent is extended or adjusted under 35 U.S.C. 154(b) by 0 days.

(21) Appl. No.: 17/131,332

(22) Filed: Dec. 22, 2020

(65) Prior Publication Data

US 2022/0193996 A1 Jun. 23, 2022

(51) Int. Cl.
*B29C 64/232* (2017.01)
*B29C 64/209* (2017.01)
(Continued)

(52) U.S. Cl.
CPC .......... *B29C 64/232* (2017.08); *B29C 64/209* (2017.08); *B29C 64/236* (2017.08);
(Continued)

(58) Field of Classification Search
CPC .................................................... B29C 64/232
See application file for complete search history.

(56) References Cited

U.S. PATENT DOCUMENTS

| | | | |
|---|---|---|---|
| 5,503,785 A | 4/1996 | Crump | |
| 6,547,995 B1 | 4/2003 | Comb | |

(Continued)

FOREIGN PATENT DOCUMENTS

| | | |
|---|---|---|
| DE | 102018128105 A1 | 5/2020 |
| DE | 102018128107 A1 | 5/2020 |
| DE | 1020181280106 A1 | 5/2020 |

*Primary Examiner* — Timothy Kennedy
(74) *Attorney, Agent, or Firm* — Peter J. Ims; Westman, Champlin & Koehler, P.A.

(57) ABSTRACT

A z-lift and leveling assembly for leveling a platen in a heated chamber of a 3D printer includes first, second, third, and fourth z-actuators in a rectangular configuration. Each z-actuator includes a linear drive configured to supply motion in the z-direction and a mounting bracket secured to the linear drive and configured to move with the linear drive in the z-direction. The assembly includes a set of four pin couplings each associated with one of the first, second, third and fourth z-actuators. Each pin coupling includes a pivot block secured to the mounting bracket with a first pivot pin forming a first pin joint between the mounting bracket and the pivot block, where the pivot block is configured to move relative to the mounting bracket about a first pivot axis of the first pivot pin. The pivot block is secured to the platen or an arm of the platen with a second pivot pin forming a second pin joint such that the pivot block and the platen move relative to each other about a second pivot axis. As the mounting bracket is moved, the pivot block moves relative to the mounting bracket about the first pivot axis and the pivot block moves relative to the platen about the second pivot axis such that a z-position of the platen can be manipulated to and maintained in a substantially level configuration in the z-direction though the independent manipulation of the first, second, third and fourth z-actuators and wherein the substantially level configuration can be maintained when the platen is incremented in the z-direction during printing of a part.

15 Claims, 10 Drawing Sheets

(51) Int. Cl.
   *B29C 64/245*   (2017.01)
   *B29C 64/25*    (2017.01)
   *B29C 64/393*   (2017.01)
   *B29C 64/236*   (2017.01)
   *B33Y 50/02*    (2015.01)
   *B33Y 30/00*    (2015.01)

(52) U.S. Cl.
   CPC ............ *B29C 64/245* (2017.08); *B29C 64/25* (2017.08); *B29C 64/393* (2017.08); *B33Y 30/00* (2014.12); *B33Y 50/02* (2014.12)

(56) References Cited

U.S. PATENT DOCUMENTS

| | | | |
|---|---|---|---|
| 6,722,872 B1 | 4/2004 | Swanson et al. | |
| 7,063,285 B1 | 6/2006 | Turley et al. | |
| 7,604,470 B2 | 10/2009 | LaBossiere et al. | |
| 7,938,356 B2 | 5/2011 | Taatjes et al. | |
| 8,419,996 B2 | 4/2013 | Swanson et al. | |
| 8,647,102 B2 | 2/2014 | Swanson et al. | |
| 8,663,533 B2 | 3/2014 | Swanson et al. | |
| 8,926,882 B2 | 1/2015 | Batchelder et al. | |
| 8,985,497 B2 | 3/2015 | Mannella et al. | |
| 9,073,263 B2 | 7/2015 | Mannella et al. | |
| 9,108,360 B2 | 8/2015 | Comb et al. | |
| 10,513,104 B2 | 12/2019 | Barclay et al. | |
| 10,688,721 B2 | 6/2020 | Swanson et al. | |
| 2010/0100224 A1* | 4/2010 | Comb | B29C 64/209 700/118 |
| 2013/0004610 A1* | 1/2013 | Hartmann | B33Y 30/00 425/162 |
| 2014/0085620 A1* | 3/2014 | Lobovsky | B33Y 10/00 355/72 |
| 2018/0304658 A1* | 10/2018 | Lee | B33Y 30/00 |
| 2019/0210284 A1 | 7/2019 | Bosveld | |
| 2019/0375156 A1* | 12/2019 | Knox | B29C 64/245 |
| 2020/0070405 A1* | 3/2020 | Barclay | B29C 64/379 |
| 2020/0108553 A1* | 4/2020 | Rogren | B29C 64/379 |
| 2020/0282645 A1* | 9/2020 | Vermuelen | B29C 64/153 |
| 2020/0376762 A1* | 12/2020 | Sweetland | B29C 64/245 |
| 2020/0376773 A1* | 12/2020 | Sweetland | B29C 64/393 |
| 2021/0299956 A1* | 9/2021 | Overby | B29C 64/209 |

\* cited by examiner

SYSTEM FOR LEVELING HEATED PLATEN IN 3D PRINTER

BACKGROUND

The present disclosure relates to additive manufacturing systems for printing or otherwise building 3D parts by material extrusion techniques. In particular, the present disclosure relates to systems and methods for leveling a build platen in a 3D printer.

Additive manufacturing, also called 3D printing, is generally a process in which a three-dimensional (3D) object is built by adding material to form a part rather than subtracting material as in traditional machining. Using one or more additive manufacturing techniques, a three-dimensional solid object of virtually any shape can be printed from a digital model of the object by an additive manufacturing system, commonly referred to as a 3D printer. A typical additive manufacturing workflow includes slicing a three-dimensional computer model into thin cross sections defining a series of layers, translating the result into two-dimensional position data, and feeding the data to a 3D printer which manufactures a three-dimensional structure in an additive build style. Additive manufacturing entails many different approaches to the method of fabrication, including material extrusion, ink jetting, selective laser sintering, powder/binder jetting, electron-beam melting, electrophotographic imaging, and stereolithographic processes.

In a typical extrusion-based additive manufacturing system (e.g., fused deposition modeling systems developed by Stratasys, Inc., Eden Prairie, Minn.), a 3D object may be printed from a digital representation of the printed part by extruding a viscous, flowable thermoplastic material from a print head along toolpaths at a controlled extrusion rate. The extruded flow of material is deposited as a sequence of roads onto a substrate, where it fuses to previously deposited material and solidifies upon a drop in temperature. The print head includes a liquefier which receives a supply of the thermoplastic material in the form of a flexible filament, and a nozzle tip for dispensing molten material. A filament drive mechanism engages the filament such as with a drive wheel and a bearing surface, or pair of toothed-wheels, and feeds the filament into the liquefier where the filament is melted. The unmelted portion of the filament essentially fills the upper portion diameter of the liquefier tube, providing a plug-flow type pumping action to extrude the molten filament material further downstream through the nozzle tip. The extruded material is deposited in a continuous flow in toolpaths according to digital data based on the digital representation of a part to be printed. The extrusion rate is unthrottled and is based only on the feed rate of filament into the liquefier, and the filament is advanced at a feed rate calculated to achieve a targeted extrusion rate, such as is disclosed in Comb U.S. Pat. No. 6,547,995.

In a system where the material is deposited in planar layers, the position of the print head relative to the substrate is incremented along a print axis (perpendicular to the build plane) after each layer is formed, and the process is then repeated to form a printed part resembling the digital representation. In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. A host computer generates additional geometry acting as a support structure for the overhanging or free-space segments of the printed part being formed. Support material is then deposited pursuant to the generated geometry during the printing process. The support material adheres to the part material during fabrication, and is removable from the completed printed part when the printing process is complete.

A multi-axis additive manufacturing system may be utilized to print 3D parts using fused deposition modeling techniques. The multi-axis system may include a robotic arm movable in six degrees of freedom. The multi-axis system may also include a build platform movable in two or more degrees of freedom and independent of the movement of the robotic arm to position the 3D part being built to counteract effects of gravity based upon part geometry. An extruder may be mounted at an end of the robotic arm and may be configured to extrude material with a plurality of flow rates, wherein movement of the robotic arm and the build platform are synchronized with the flow rate of the extruded material to build the 3D part. The multiple axes of motion can utilize complex tool paths for printing 3D parts, including single continuous 3D tool paths for up to an entire part, or multiple 3D tool paths configured to build a single part. Use of 3D tool paths can reduce issues with traditional planar toolpath 3D printing, such as stair-stepping (layer aliasing), seams, the requirement for supports, and the like. Without a requirement to slice a part to be built into multiple layers each printed in the same build plane, the geometry of the part may be used to determine the orientation of printing.

Build platens and substrates are used in additive process modeling techniques to stabilize 3D printed parts under construction. Typically, it is preferred that a part or model under construction be strongly adhered to a releasable modeling substrate which is in turn adhered to a flat build platen, and that the modeling substrate is constrained to the platen during part build but is easily removable after the part is built. The larger a part under construction, the more internal stress and or strain it will experience during a build, especially when printing at high temperatures. Stresses and strains generated within the modeling material tend to warp the printed structures unless the structures are supported in their correct orientation. Adherence of the part to a substantially flat build surface can minimize or eliminate part warpage as the part is constructed and experiences thermal gradients, to achieve part accuracy. However, there is a continuing need for large format build platens that will maintaining flatness in high temperature build environments.

SUMMARY

An aspect of the present disclosure relates to a 3D printer having a heated build chamber, a print head having a nozzle tip and a platen within the heated build chamber. The platen is movable in a z-direction along a vertical print axis, where the platen has a generally flat upward-facing build surface and four platen arms proximate each of four corner locations of the platen. Each arm extending beyond the build surface in the x-direction. A z-lift and leveling assembly is used to move the platen in the z-direction. The z-lift and leveling assembly includes first, second, third and fourth linear drives, where each linear drive is proximate a corner location of the platen. Each of the first, second, third and fourth linear drives includes a vertical rod secured within the printer and a translating member configured to move up and down along a length of the rod under control of a driver. The driver is configured to actuate motion of the translating member in response to commands from a controller. First, second, third and fourth mounting brackets are secured to the translating member of each linear drive and configured to travel with the associated translating member along the vertical rod when the linear drive is actuated. A set of four pin couplings connects the platen to the linear drive where each set of pin couplings is associated with one of the first, second, third and fourth linear drives. Each pin coupling includes a pivot block coupled to the mounting bracket and a pivot pin set comprising an x-direction pin forming a first pin joint between the mounting bracket and the pivot block, and a y-direction pin forming a second pin joint between the pivot block and one of the platen arms, wherein the x-direction pin and the y-direction pin are orthogonal to each other. The first pin joint for each of the first, second, third and fourth linear drives comprises a fixed pin joint and the second pin joint of the first and second linear drives comprises a fixed pin joint on a first end of the platen while the second pin joint of the third and fourth linear drives comprises a floating pin joint on a second end of the platen, opposite the first end of the platen, each such floating pin joint being configured to accommodate thermal expansion and contraction of the platen in the x-y plane. As the mounting bracket is moved, the pivot block moves relative to the mounting bracket about the first pin joint, the pivot block moves relative to the first or second platen support beams about the second pin joint, such that the platen can be manipulated to and maintained in a substantially level configuration in the z-direction though the independent manipulation of the first, second, third and fourth linear drives and wherein the substantially level configuration can be maintained when the platen is incremented in the z-direction during printing of a part.

Another aspect of the present disclosure includes a z-lift and leveling assembly for leveling a platen in a heated chamber of a 3D printer. The z-lift and leveling assembly includes first, second, third, and fourth z-actuators in a rectangular configuration. Each z-actuator includes a linear drive configured to supply motion in the z-direction and a mounting bracket secured to the linear drive and configured to move with the linear drive in the z-direction. The assembly includes a set of four pin couplings each associated with one of the first, second, third and fourth z-actuators. Each pin coupling includes a pivot block secured to the mounting bracket with a first pivot pin forming a first pin joint between the mounting bracket and the pivot block, where the pivot block is configured to move relative to the mounting bracket about a first pivot axis of the first pivot pin. The pivot block is secured to the platen or an arm of the platen with a second pivot pin forming a second pin joint such that the pivot block and the platen move relative to each other about a second pivot axis. As the mounting bracket is moved, the pivot block moves relative to the mounting bracket about the first pivot axis and the pivot block moves relative to the platen about the second pivot axis such that a z-position of the platen can be manipulated to and maintained in a substantially level configuration in the z-direction though the independent manipulation of the first, second, third and fourth z-actuators and wherein the substantially level configuration can be maintained when the platen is incremented in the z-direction during printing of a part.

Definitions

Unless otherwise specified, the following terms as used herein have the meanings provided below:

Directional orientations such as "above", "below", "top", "bottom", and the like are made with reference to a layer-printing direction of a 3D part. In the embodiments shown below, the layer-printing direction is the upward direction along the vertical z-axis (also referred to as a vertical "print axis"). In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The term "providing", such as for "providing a print head", when recited in the claims, is not intended to require any particular delivery or receipt of the provided item. Rather, the term "providing" is merely used to recite items that will be referred to in subsequent elements of the claim(s), for purposes of clarity and ease of readability.

The terms "about" and "substantially" are used herein with respect to measurable values and ranges due to expected variations known to those skilled in the art (e.g., limitations and variabilities in measurements).

The terms "additive manufacturing system" and "3D printer" refer to a system that prints, builds, or otherwise produces parts, prototypes, or other 3D items and/or support structures at least in part using an additive manufacturing technique. The additive manufacturing system may be a stand-alone 3D printer, a robotic system, a sub-unit of a larger system or production line, and/or may include other non-additive manufacturing features, such as subtractive-manufacturing features, pick-and-place features, two-dimensional printing features, and the like.

The term "pivot pin" refers to a pin or rod intended or used for insertion into a body and allowing rotation of the body about the pin, which provides a pivot axis.

The term "pin joint" refers to a pin connection that allows rotation about a single pivot axis. A pin joint can be used to connect two or more members around a single rotational axis The term "fixed pin joint" is a pin joint connection between two objects that allows for rotation in about an axis of rotation of a pin, or one degree of freedom where axial loads are transmitted but torques are not transmitted.

The term "floating pin joint" is a pin joint connection between two objects that allows for rotation in about an axis of rotation of a pin and translational movement of one object relative to the other object, or two degrees of freedom where axial loads are transmitted but torques are not transmitted.

DETAILED DESCRIPTION

The present disclosure is directed to an apparatus and methods for leveling a metal build platen that has become heated while heating the build chamber to an elevated printing temperature. While the presently disclosed apparatus and methods can be utilized with any sized platen, the disclosed apparatus and methods are particularly useful when printing parts using large format platens which can become unlevel due to thermal expansion while raising the temperature of the platen from ambient temperatures to printing temperatures in a heated build chamber. Larger format platens include but are not limited to 24 in. by 24 in. platens (576 sq. in.) and 32 in. by 40 in. platens (1,280 sq. in.) and can exceed these dimensions. However, the presently disclosed apparatus and method can be utilized with any sized platen provided the height of the platen can be independently adjusted proximate all four corners.

When large format printers are heated to printing temperatures, the large format platens expand in the x, y and z directions. Large format platens are typically attached to a z-gantry system in a plurality of locations which can cause stress and strain in the x, y and z directions. While large area platens are typically level at ambient or slightly warmed conditions, such as up to 100° C., the large area platens can become contorted or unlevel at elevated printing temperatures due to thermal expansion, as a result of stress and strain in the platen in the x, y and z-directions. When constrained and heat above 100° C., metals used to construct large area platens often begin to twist, warp and deform. The platen can become torqued into a jammed configuration, causing premature wear or damage or burning out gantry motors. When all four corners of the platen are constrained and the platen begins to change planarity, there is a risk of shearing components of the z-gantry.

A typical process for leveling a platen requires manual adjustment of a plurality of leveling mechanisms, such as threaded bolts or screws, to bring the platen into alignment or parallel with the x-y gantry plane. The manual adjustment is an iterative process and typically is completed as a factory calibration at room temperatures. At temperatures higher than 100° C. with a large format platen, deformation can be more severe when it has reached a desired oven temperature, and a platen which was level ad room temperature is no longer level or normal to the z-direction. A non-level platen will cause printing errors and create the potential for nozzle clogging during extrusion. When the build chamber is hot, it is not safe to manually adjust the platen z-height for a recalibration.

The present disclosure describes a z-lift and leveling assembly that utilizes four independent z-actuators that engage the platen proximate the four corners of the platen or proximate the four corners of a platen mounting system using pivot pin connections designed to accommodate thermal expansion and contraction of the platen so that planarity can be achieved and maintained. The four z-actuators are operated utilizing an automated approach which can be performed in a heated environment within an oven or build chamber.

Along with the four, independent z-actuators, the present disclosure utilizes a print head that is moved in the z direction to a known location using a local z-actuator and a position sensor. Each of the independent z-actuators is attached to the platen or the mounting system with spaced apart x and y direction fixed pin joints proximate one end that allow for relative rotational movement and spaced apart fixed x direction pin joints and floating y direction pin joints proximate the other end that allow for relative rotational movement and translational movement as the platen is moved in the z direction. Using the four independent z-actuators and the fixed x and y pin joints proximate opposite corners of one end of the platen and fixed x direction pin joints and floating y direction pin joints proximate opposite corners at the other end of the platen, along with the known z position of the print head in a plurality of x-y locations, allows the platen to be leveled using an automated level calibration method after the platen has been brought up to printing temperatures. The automated level calibration method includes moving the print head in the x-y plane to corner locations of a build surface of the platen while z positions of the print head are known, and separately raising corner of the platen until contacting the print head proximate each corner location.

Each z-actuator comprises an independently operable linear drive oriented vertically along the print axis. Exemplary linear drives include a ball/screw assembly where a ball with a threaded bore is coupled to the platen or platen mounting system and a threaded ball screw is actuated by a motor to lift and lower the platen, and a lead screw/nut assembly where the nut is fixedly coupled to the platen or platen mounting system and the nut is actuated by a motor to life and lower the platen. An encoder is used to monitor the rotation of the motor or the threaded screw to determine the z height of the platen in the corners. However, other actuating systems and z-axis positioning sensors are within the scope of the present disclosure.

Figure 1:
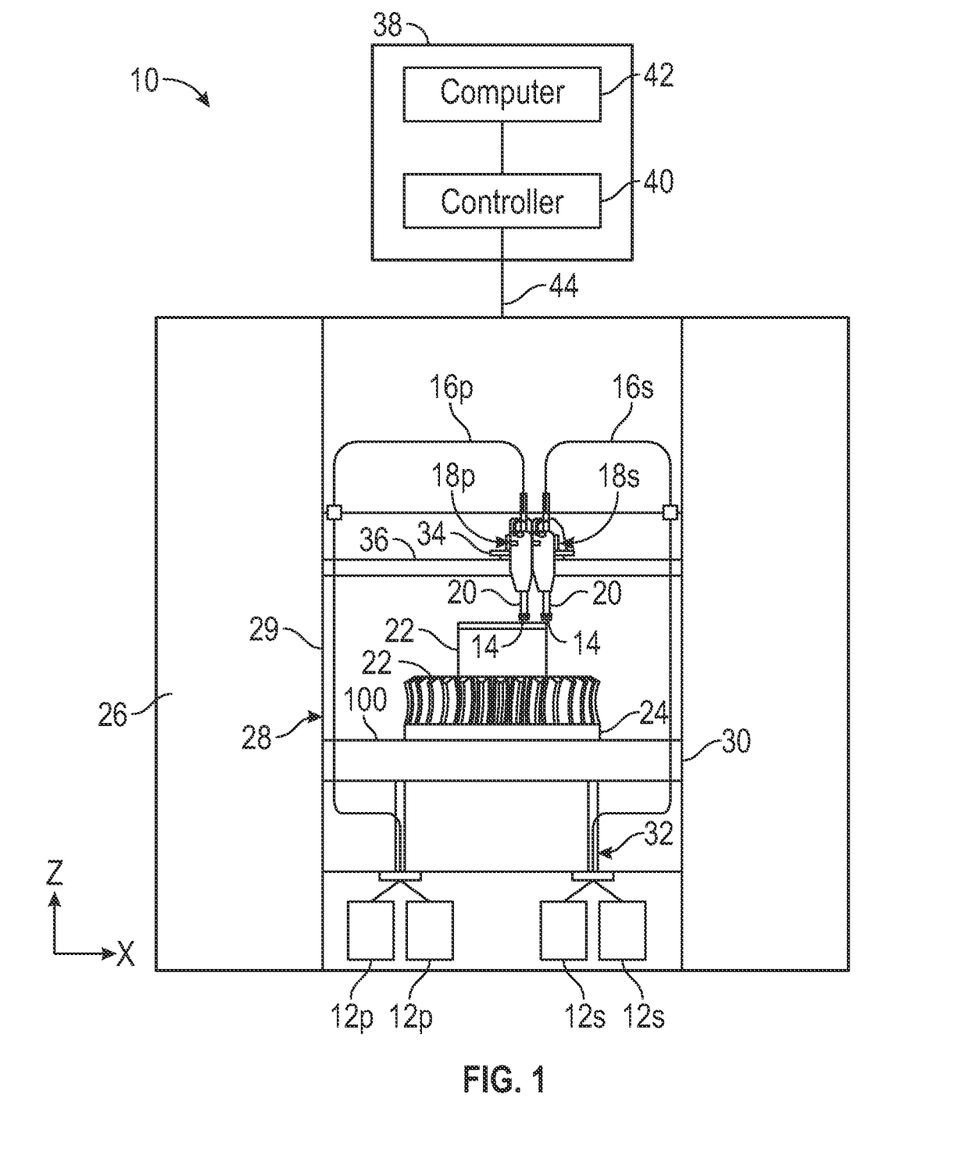
FIG. 1 is a front schematic view of an extrusion-based 3D printer.

The present disclosure may be used with any suitable extrusion-based 3D printer. For example, FIG. 1 illustrates a schematic view of an exemplary 3D printer 10 that has a substantially horizontal print plane, and where the part is printed and indexed in a substantially vertical direction. Parts are printed in a layer by layer manner using two print heads 18p for part material and 18s for support material or printed with part material alone. The illustrated 3D printer 10 uses four consumable assemblies, two consumable assemblies 12p for part material and two consumable assemblies 12s for support material. Each consumable assembly 12p and 12s is a removable, and replaceable supply device such that dual supplies of consumable filament of part material and dual supplies of consumable material for support material can be retained and utilized in a single 3D printer 10. All of the consumable assemblies 12p and 12s may be identical or different in composition. Each consumable assembly 12 may retain the consumable filament on a wound spool, a spool-less coil, or other supply arrangement, such as discussed for example in Turley et al. U.S. Pat. No. 7,063,285; Taatjes at al., U.S. Pat. No. 7,938,356; and Mannella et al., U.S. Pat. Nos. 8,985,497 and 9,073,263. While four assemblies are illustrated, the present disclosure is not limited to a 3D printer with four assemblies. Rather, the 3D printer of the present disclosure can utilize any number of assemblies including two or more assemblies containing the same or different consumable materials.

Figure 2:
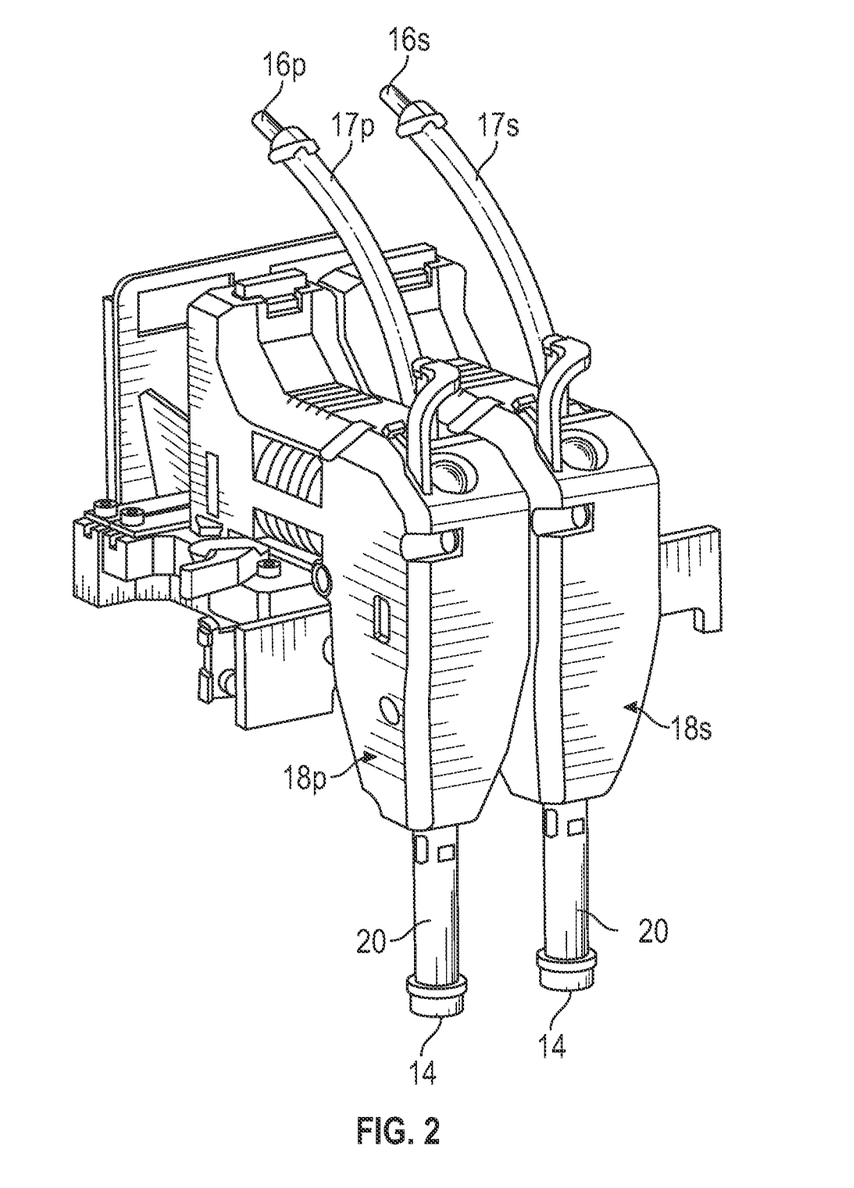
FIG. 2 is a view of a pair of print heads on a head carriage.

As shown in FIG. 2, each print head 18p and 18s is a device comprising a housing that retains a liquefier 20 having a nozzle tip 14. A filament feed path 16p and 16s interconnects each consumable assembly 12p and 12s and print head 18p and 18s, and provides a filament feed path from the filament supply to the print head, where the filament feed paths 16p and 16s are substantially sealed from ambient conditions. Upper ends of feed path 16p and 16s can be attached to the print heads 18p and 18s using end piece 17p and 17s. In the illustrated embodiment, the end piece 17p and 17s is sufficiently rigid to retain an arcuate configuration of the feed path 16p and 16s with a radius that prevents the filament from being bent too sharply which can cause the filament to break or crease, resulting in the filament being misfed to the print head 18p and 18s.

Exemplary 3D printer 10 prints parts or models and corresponding support structures (e.g., 3D part 22 and support structure 24) from the part and support material filaments, respectively, of consumable assemblies 12, by extruding roads of molten material along toolpaths. During a build operation, successive segments of consumable filament are driven into print head 18 where they are heated and melt in liquefier 20. The melted material is extruded through nozzle tip 14 in a layer-wise pattern to produce printed parts. Suitable 3D printers 10 include fused deposition modeling systems developed by Stratasys, Inc., Eden Prairie, Minn. under the trademark "FDM".

As shown, the 3D printer 10 includes system cabinet or frame 26, build chamber 28, platen 30, z-lift and leveling assembly 32 according to the present invention, head carriage 34, and head gantry 36. Cabinet 26 may include container bays configured to receive consumable assemblies 12p and 12s. In alternative embodiments, the container bays may be omitted to reduce the overall footprint of 3D printer 10. In these embodiments, consumable assembly 12 may stand proximate to printer 10.

Build chamber 28 contains platen 30 for printing 3D part 22 and support structure 24 and is heated to create an ovenized build environment. Build chamber 28 may be an enclosed environment and may be heated (e.g., with circulating heated air) to reduce the rate at which the part and support materials solidify after being extruded and deposited (e.g., to reduce distortion and curling). The printer 10 may include a thermal insulator surrounding the heated build environment to insulate the print head electronics from the heated space, while moving print head nozzle tips 20 within a heated build envelope. In some embodiments, the thermal insulator includes insulators wherein baffles on either side of the print heads move in concert with them, to maintain the heated thermal space. Embodiments of thermal insulators for a heated build chamber are disclosed in Swanson U.S. Pat. Nos. 6,722,872 and 10,688,721 and Bosveld U.S. Patent Application Publication 2019/0210284.

Platen 30 is a build platform having an upward-facing build surface 100 on which 3D part 22 and support structure 24 are printed in a layer-by-layer manner. In some embodiments, platen 30 may engage and support a build substrate on build surface 100, which may be a tray substrate fabricated from plastic, corrugated cardboard, or other suitable material, and may also include a flexible plastic sheet, polymeric film or liner, painter's tape, polyimide tape, a magnetic sheet, or other disposable fabrication for adhering deposited material onto the build surface 100 or onto the build substrate.

Platen 30 is supported and positioned by a z-gantry, which in the present invention is the z-lift and leveling assembly 32 as described in detail herein. The z-lift and leveling assembly 32 is configured to displace platen 30 in a vertical z-direction as a part is built in a layer-wise manner, and is further configured to maintain a level z-height of the build surface 100 even as the platen 30 undergoes thermal expansion and contraction.

Head carriage 34 is a unit configured to receive and retain print heads 18p and 18s and is supported by head gantry 36. In the shown embodiment, head gantry 36 is a mechanism configured to move head carriage 34 (and the retained print heads 18p and 18s) in (or substantially in) a horizontal x-y plane above platen 30. In some embodiments, one or both of print heads 18p and 18s are also movable in the z direction over at least a small distance (a "local z"), for example using a local z-actuator such as the toggle disclosed in Stratasys U.S. Pat. Nos. 8,647,102 and 8,663,533. Examples of suitable gantry assemblies for head gantry 36 include those disclosed in Swanson et al., U.S. Pat. No. 6,722,872; and Comb et al., U.S. Pat. No. 9,108,360, where head gantry 36 may also support deformable baffles (not shown) that define a ceiling for build chamber 28. Head gantry 36 may utilize any suitable bridge-type gantry or robotic mechanism for moving head carriage 34 (and the retained print heads 18), such as with one or more motors (e.g., stepper motors and encoded DC motors), gears, pulleys, belts, screws, robotic arms, and the like.

FIG. 2 illustrates an example embodiment of two print heads 18p and 18s which include the print head drives which supply filament. The shown print heads 18p and 18s are similarly configured to receive a consumable filament, melt the filament in liquefier 20 to product a molten material, and deposit the molten material from a nozzle tip 14 of liquefier 20. The print head 18 can have any suitable configuration. In addition to the dual-tip embodiment as illustrated, examples of suitable devices for print head 18, and the connections between print head 18 and head gantry 36 include those disclosed in Crump et al., U.S. Pat. No. 5,503,785; LaBossiere, et al., U.S. Pat. No. 7,604,470; Swanson et al., U.S. Pat. Nos. 8,419,996 and 8,647,102; Batchelder U.S. Pat. No. 8,926,882; and Barclay et al. U.S. Pat. No. 10,513,104. In one example, during a build operation, one or more filament drive mechanisms are directed to intermittently and successively feed segments of the modeling and support materials (e.g., consumable filaments via feed paths or guide tubes 16) to print head 18 from consumable assemblies 12.

3D printer 10 also includes controller assembly 38, which may include one or more control circuits (e.g., controller 40) and/or one or more host computers (e.g., computer 42) configured to monitor and operate the components of 3D printer 10. For example, one or more of the control functions performed by controller assembly 38, such as performing move compiler functions, can be implemented in hardware, software, firmware, and the like, or a combination thereof; and may include computer-based hardware, such as data storage devices, processors, memory modules, and the like, which may be external and/or internal to system 10.

Controller assembly 38 may communicate over communication line 44 with print heads 18, filament drive mechanisms, build chamber 28 (e.g., with a heating unit for the chamber), head carriage 34, motors for the z-left and leveling assembly 32 and head gantry 36, and various sensors, calibration devices, display devices, and/or user input devices, and any other suitable component of 3D printer 10. While illustrated as a single signal line, communication line 44 may include one or more electrical, optical, and/or wireless signal lines, which may be external and/or internal to 3D printer 10, allowing controller assembly 38 to communicate with various components of 3D printer 10.

During operation, controller assembly 38 may direct z-lift and leveling assembly 32 to move platen 30 to a predetermined height within build chamber 28. Controller assembly 38 may then direct head gantry 36 to move head carriage 34 (and the retained print heads 18) around in the horizontal x-y plane above build chamber 28, and also to move the z direction. Controller assembly 38 may also direct print heads 18 to selectively advance successive segments of the consumable filaments from consumable assembly 12 through guide tubes 16 and into the liquefier 20.

Figure 3:
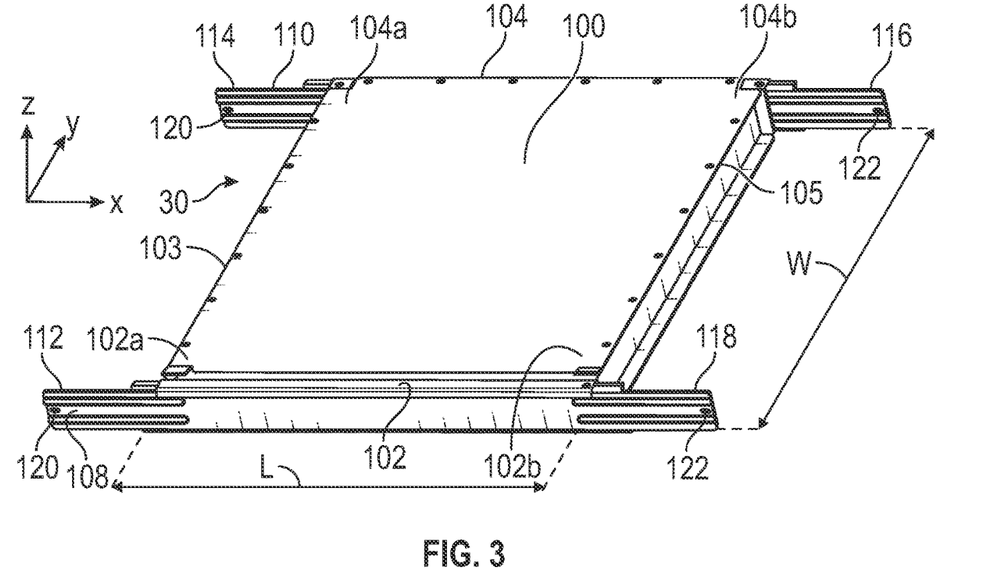
FIG. 3 is a perspective view of a platen for use in the extrusion-based 3D printer.

As illustrated in FIG. 3, the platen 30 includes the build surface 100 having a length L in the x direction and a width W in the y direction, and a pair of spaced apart x-direction beams 108 and 110. The build surface 100 has a front edge 102 and a rear edge 104 each along the length L thereof, and a left edge 103 and a right edge 105, each along the width W thereof. As shown, the front edge terminates in corners 102a and 102b at the left edge 103 and right edge 105, respectively, and the rear edge terminates in corners 104a and 104b at the left edge 103 and right edge 105, respectively. Beam 108 is attached proximate front edge 102 of the build surface 100, and beam 110 is attached proximate rear edge 104 of the build surface 100. The x-direction beams 108 and 110 each extend beyond the build surface 100 in the x-direction to provide a means for coupling the platen 30 to the z-lift and leveling system 32. Specifically, the ends of beam 108 form arms 112 and 118 associated with corners 102a and 102b, respectively, of the build surface 100. The ends of beam 110 form arms 114 and 116 associated with corners 104a and 104b, respectively, of the build surface 100. Arms 112 and 114 each include a lateral hole 120, and arms 116 and 118 each include a lateral slot 122, used for coupling platen 30 to z-lift and leveling system 32. The holes 120 are utilized to form a fixed pin joint and the slots 122 are utilized to form a sliding pin joint, as described in detail below.

Figure 4:
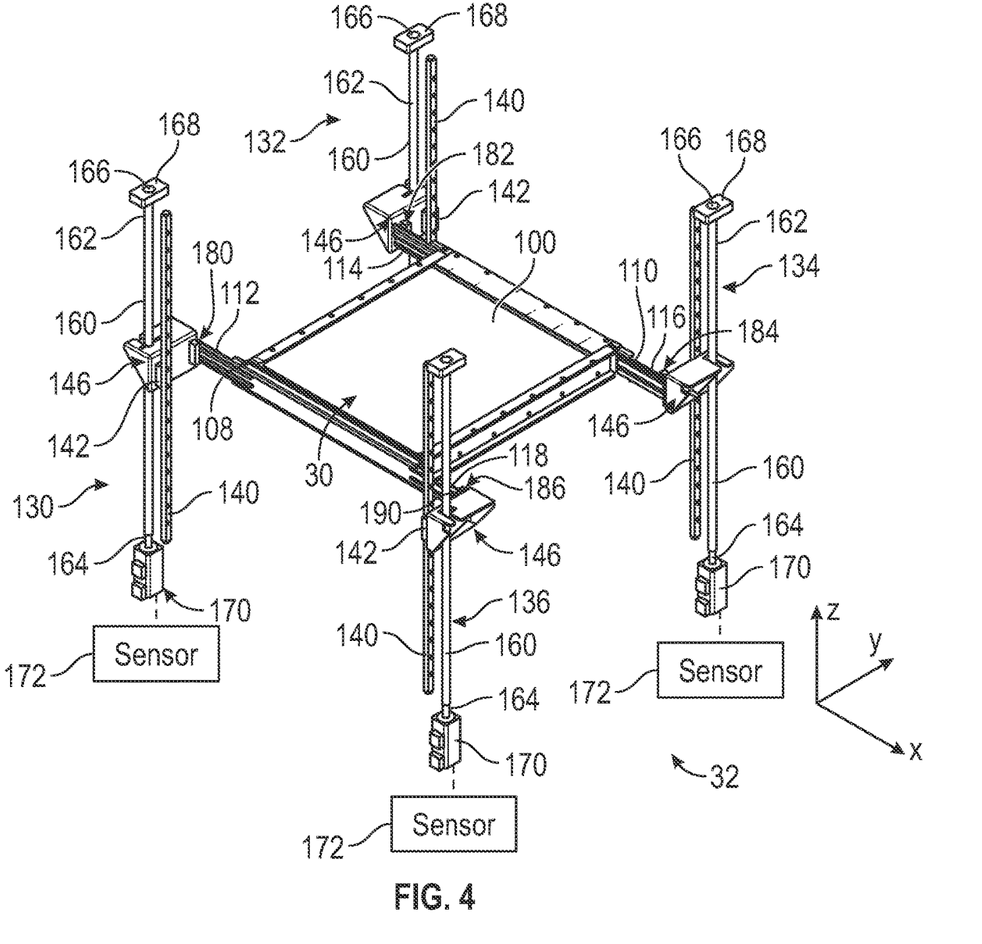
FIG. 4 is a perspective view of the platen connected with pin joint couplings to four independent z-actuators.

Platen 30 is supported by the z-lift and leveling assembly 32. As illustrated in FIG. 4, the z-lift and leveling system 32 comprises z-actuators 130, 132, 134 and 136 and pin couplings 180, 182, 184 and 186, wherein each z-actuator and each pivot block are respectively associated with arms 112, 114, 116 and 118 of the platen 30, and wherein the pivot blocks form pin joint couplings with the holes 120 and slots 122 in the arms to thereby couple the platen to the z-actuators. The z-actuators 130, 132, 134 and 136 are each similarly constructed. In the present application, the z-actuator 130 will be described in detail with the understanding that the z-actuators 132, 134 and 136 have similar components.

Z-actuator 130 comprises a linear drive, which in the shown embodiment is formed by lead nut 156 (shown in FIGS. 5-8) engaged on a vertically-mounted threaded rod 160 and driven by motor 170, and a mounting bracket 146 driven along the z-axis by the linear drive and configured for attachment to the platen 30. Mounting bracket 146 is affixed to lead nut 156, which rides up on down the threaded rod 160 as the threaded rod 160 converts rotational motion from the motor 170 to linear motion. Z-actuator 130 of the shown embodiment further comprises guide rail 140, a vertical shaft mounted in parallel to threaded rod 160 which assists in stabilizing the mounting bracket 146 and restricting its movement to a substantially linear direction along the threaded rod 160, and a guide bearing 142 attached to mounting bracket 146. The guide bearing 142 rides along the guide rail 140, providing lateral support for the mounting bracket 146 of z-actuator 130 as it travels up and down. The threaded rod 160 and vertical rail 140 are fixedly mounted within the printer (such as affixed to a wall or ceiling of the build chamber 28).

As shown in FIGS. 5-8, the threaded rod 160 is positioned through a key slot 163 in the mounting bracket 146, such that the mounting bracket 146 does not interfere with a rotation of the threaded rod 160. The mounting bracket 146 has sufficient structural integrity to couple the z-actuator 130 to the platen 30 and controllably move the platen 30 in the z direction.

The threaded rod 160 and vertical rail 140 are fixedly mounted within the printer. In the shown embodiment, a top end 162 of the threaded rod 160 is positioned in a receptable 166 of a mounting plate 168, where the threaded rod 160 rotates within the receptacle 166. The mounting plate 168 is secured to printer 10, e.g., to a wall or ceiling of the build chamber 28. A bottom end 164 of the threaded rod 160 is coupled to the motor 170, which also is secured to the printer 10, e.g., to wall 29 of the build chamber 28. The top of each guide rail 140 may connect to the underside of mounting plate 168.

An encoder 172 is utilized to sense the rotation of the motor 170 which is correlated to the rotation of the threaded rod 160. As mentioned, the motor 170 causes the threaded rod 160 to rotate clockwise and counter-clockwise and engage the lead nut 156 which causes the mounting bracket 146 and the platen 30 to be raised and lowered in the z direction, thereby lifting and lowering platen 30 in the z-direction. Knowing the pitch of the threads on the rod 160 and the number of rotations of the rod 160 as sensed by the encoder 172 allows the position of the platen 30 to be coarsely determined. However, as explained below, the use of the threaded rod 160 actuated by the motor 170 where the rotation is sensed by the encoder 172 does not account for variations in the z-direction location of the platen 30, and particularly its build surface 100, when heated to printing temperatures within the build chamber 28. While an encoder 172 is described, other position sensors are within the scope of the present disclosure.

A mentioned above, the z-lift and leveling system 32 further comprises a set of four pin couplings 180, 182, 184 and 186, which are associated respectively with the first, second, third and fourth z-actuators 130, 132, 134 and 136, and pivotably couple the mounting bracket 146 of the associated z-actuator to the platen 30. Each pin coupling comprises a set of pivot pins (one having a x-direction rotational axis and the other having a y-direction rotational axis) positioned in a hole 120 or slot 122 of the platen arms 112, 114, 116 and 118 and an associated pivot block 190, wherein the associated pivot block is secured to a sidewall 144 of the mounting bracket 145 of the associated z-actuator.

Figure 5:
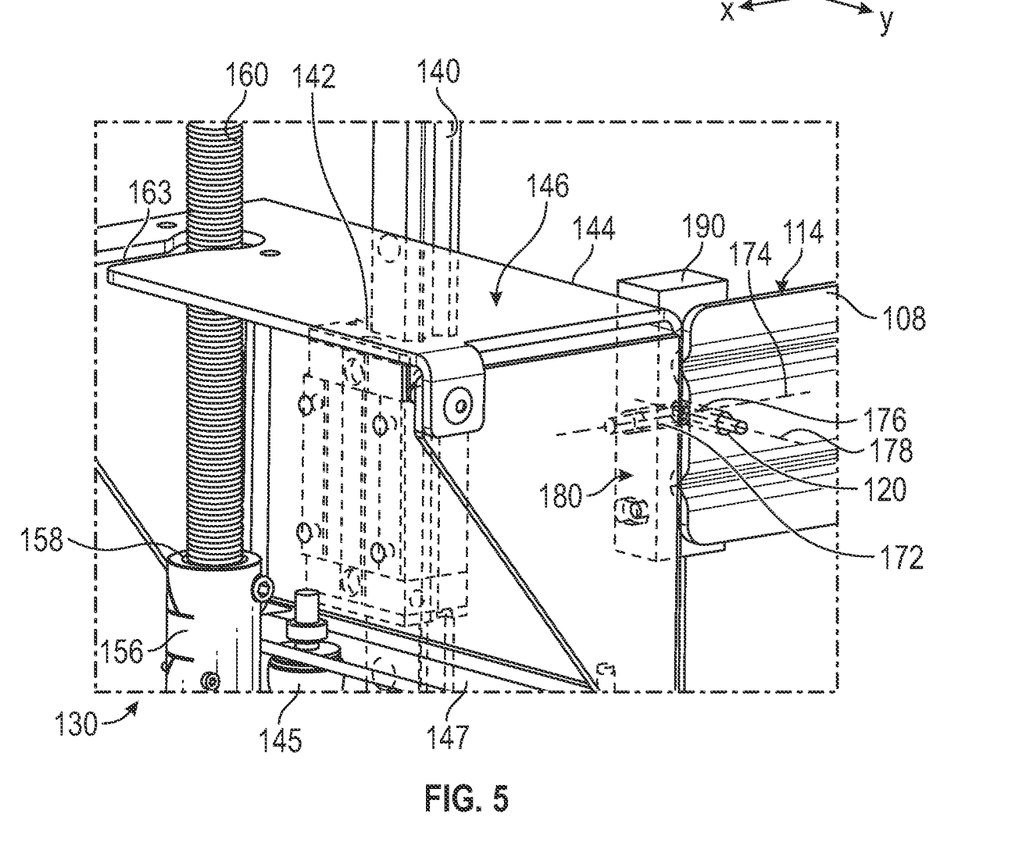
FIG. 5 is a detail view of a pin joint coupling and a first z-actuator, illustrating two fixed pin joints.
Figure 6:
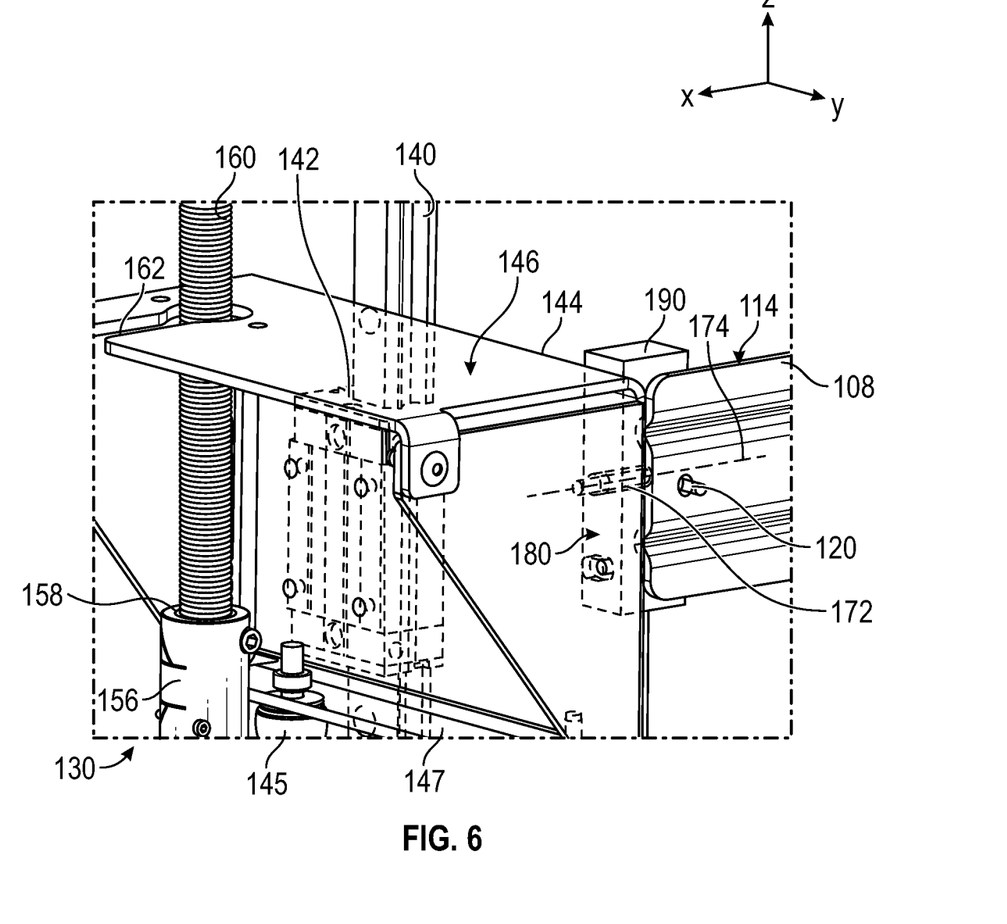
FIG. 6 is a detail view of a pin joint coupling of the first z-actuator, illustrating a single fixed pin joint in an x-direction.
Figure 7:
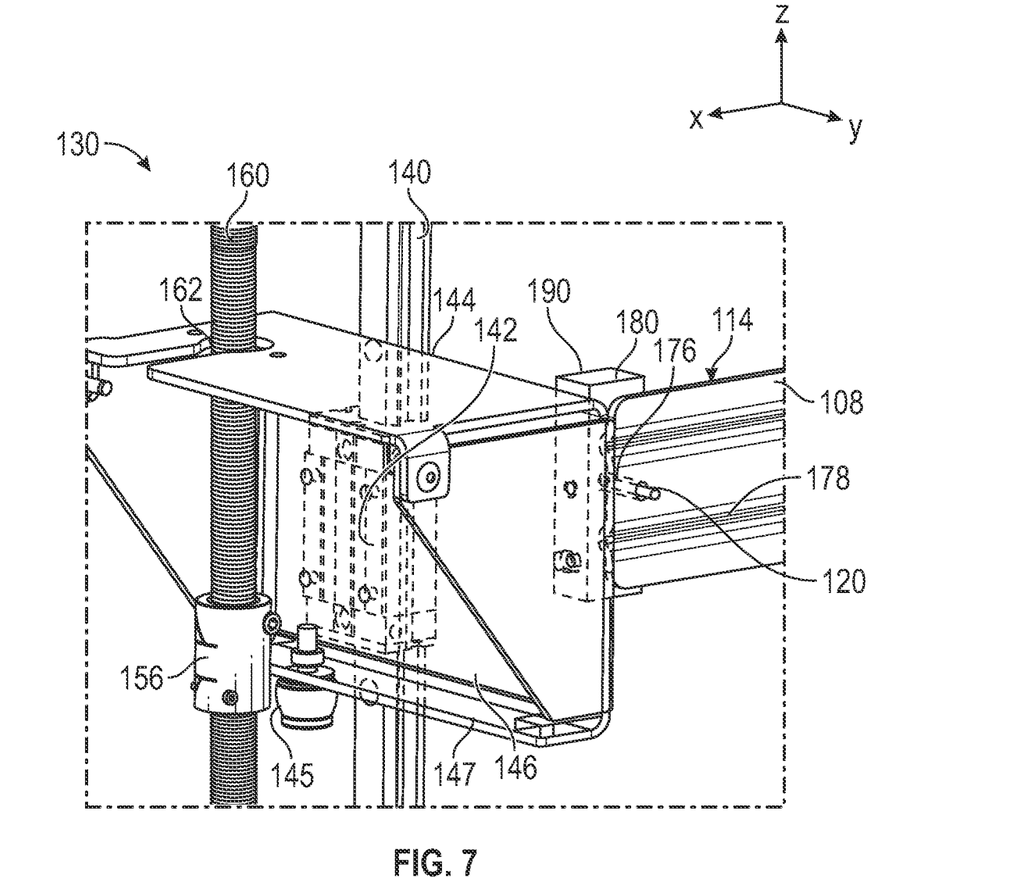
FIG. 7 is a detail view of a pin joint coupling of the first z-actuator, illustrating with a single fixed joint in a y-direction.

FIGS. 5-7 illustrate pin coupling 180, coupling platen arm 114 to mounting bracket 146 of z-actuator 130. Referring to FIGS. 5 and 6, pivot block 190 is coupled to the mounting bracket 146 with a fixed pin joint formed by a pivot pin 142. Pivot pin 172 extends in the x-direction through the sidewall 144 of the mounting bracket 146 and into the pivot block 190. The pivot pin 172 connects the mounting bracket 146 to the pivot block 190 with a fixed pin joint allowing rotation of the pivot block 190 about an x-axis 174 of the pivot pin 172. The fixed pin joint allowing rotation of the pivot block 190 about an x-axis is substantially the same for each of the pin couplings 180, 182, 184 and 186.

Referring to FIGS. 5 and 7, the platen arm 112 is coupled to the pivot block 190 with a pivot pin 176. Pivot pin 176 extends in the y-direction through the hole 120 in arm 112 and into the pivot block 190 to form a fixed pin joint. The pivot pin 176 allows the x-direction beam 108 to pivot about an axis 178 of the pivot pin 176. Similarly, a pivot pin 176 extends from pivot block 190 in the x-direction and through the hole 120 in arm 114 to form another fixed pin joint with z-actuator 132.

Figure 8:
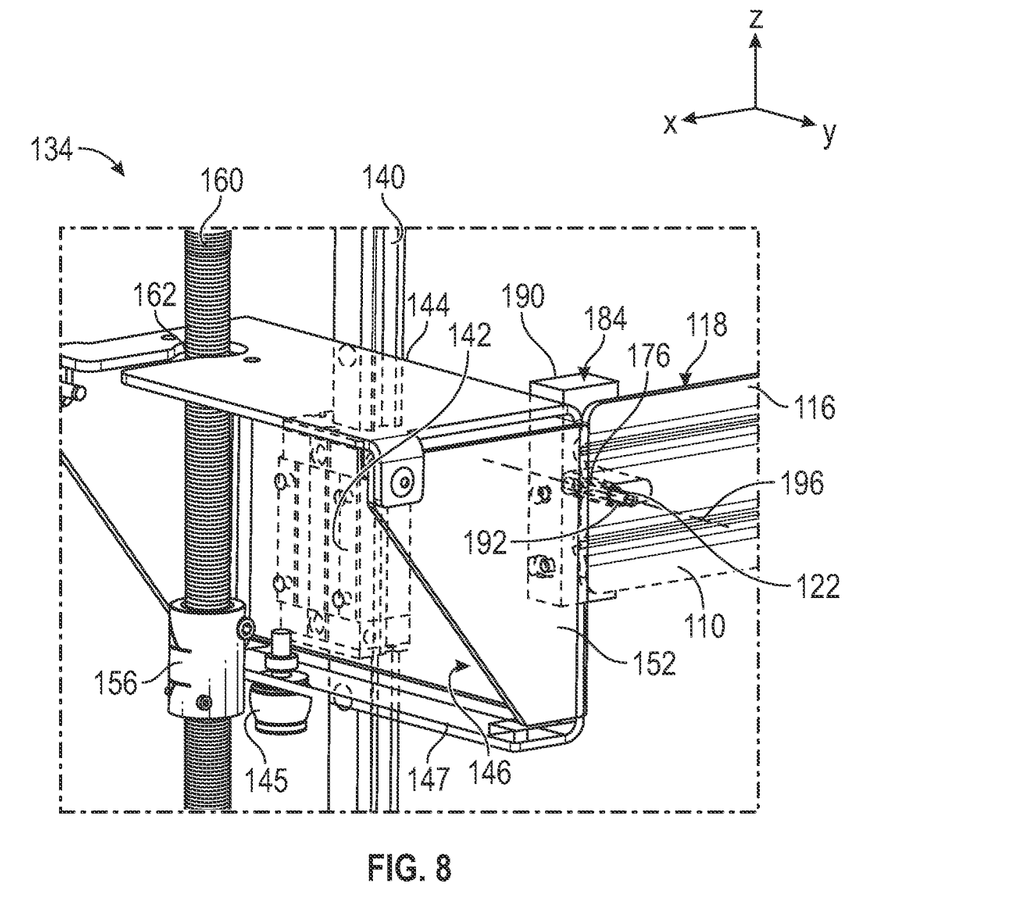
FIG. 8 is a detail view of a pin joint coupling of a third z-actuator, illustrating a floating pin joint.

FIG. 8 illustrates pin coupling 184, coupling platen arm 118 to mounting bracket 146 of z-actuator 134. Referring to FIG. 8, the platen arm 118 is coupled to the pivot block 190 with a pivot pin 192. Pivot pin 192 extends in the y-direction through the slot 122 in arm 118 and into the pivot block 190 to form a floating pin joint having a rotational axis 196. The pivot pin 192 positioned through the slot 122 allows the x-direction beam 110 to pivot about the rotational axis 196, while allowing for thermal expansion and contraction of the platen 30 in the x-y plane as the build chamber 28 is heated and cooled. Similarly, a pivot pin 192 extends in the y-direction through the slot 122 in arm 116 and into the pivot block 190 to form another floating pin joint with z-actuator 136. In this manner, the pivot couplings 180 and 182 on one side of the platen 30 are fixed in each axis of rotation, and the pivot couplings 184 and 186 on the other side of the platen 30 are fixed in one axis and floating in the other axis.

Precise horizontal alignment of the platen is instrumental toward achieving highly accurate printed parts. At heated conditions, such as at temperatures above 100° C., it is difficult to maintain precise horizontal platen positioning while the metal platen or platen structure is being subjected to thermal expansion and warping. Such stresses to the platen mountings can cause permanent damage or premature wear on system components. The approach used to hold onto each corner of the platen or platen structure becomes highly important in enabling control and adjustment of the platen to achieve accurate horizontal positioning, especially in the case of a large platen size or weight.

Using the approach of the current disclosure, the two-pivot pin coupling on each z-actuator is easy to manufacture, is economical to build, and can also be located outside the heated build chamber without being subjected to deformation or damage from the platen structure or its supports.

Figure 9:
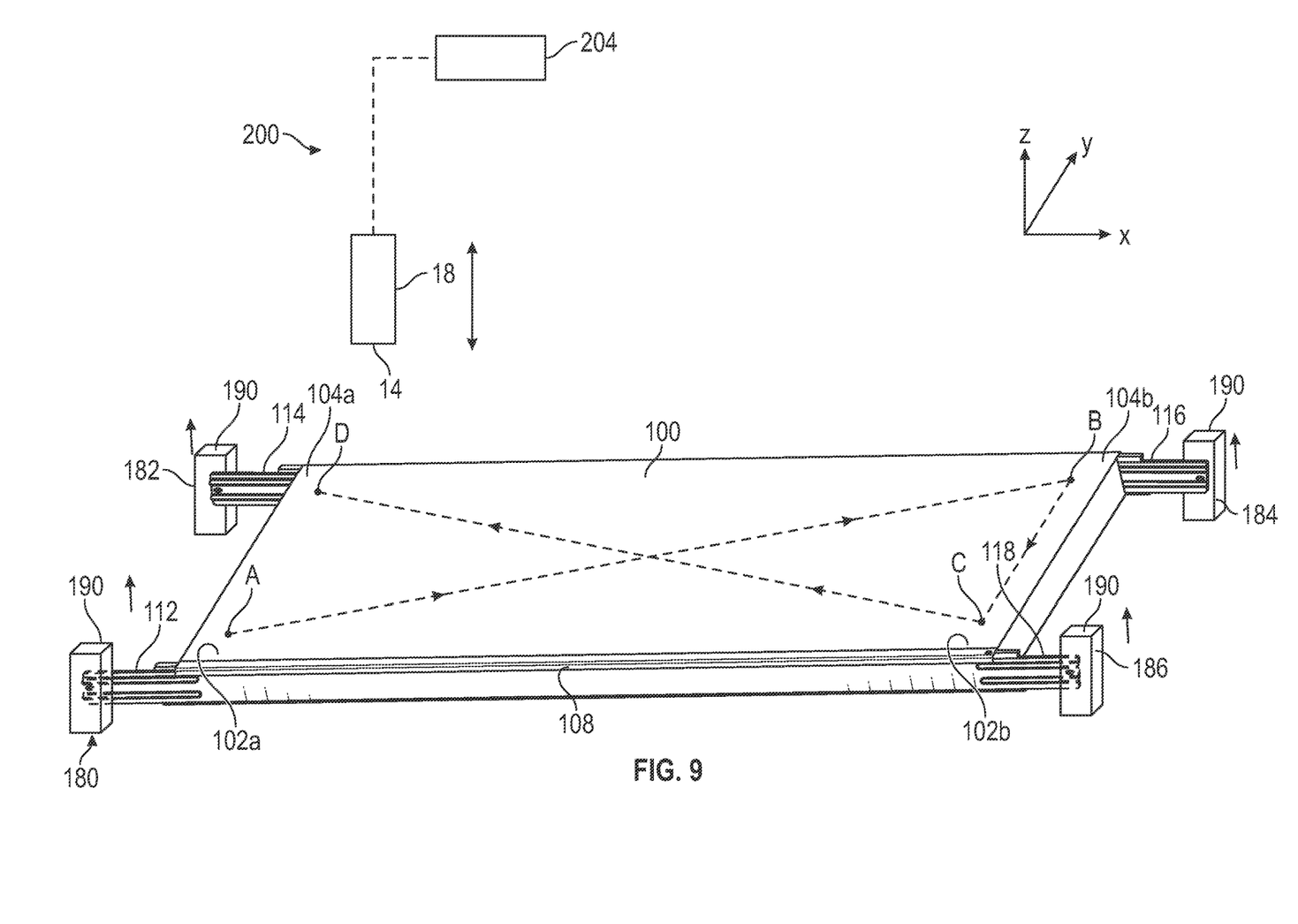
FIG. 9 is a schematic view of the platen with four pin joint couplings and a print head with a local z-actuator and a z position sensor.

Along with the z-lift and leveling system 32 to move the platen in the z direction, the 3D printer 10 of the disclosed embodiment includes a local z-axis actuator 200 for moving the print head 18 in the z direction relative to the head gantry 36 as illustrated in FIG. 9. A linear encoder 204 senses the z-position of the nozzle tip 14, which as described below is also used as an indication of z-position of the build surface 100. While a print head 18 with linear encoder 204 is described herein, other manner of sensing z-height of the platen can be utilized, including contact sensors (such as a plunger) and non-contact sensors, with or without use of a local z actuator on the print head.

The four independent z-axis actuators 130, 132, 134 and 136 that move the platen 30 in the z-direction and the pin joints connecting the z-actuators to the platen 30 allow automatic z-leveling of the platen build surface 100 within the heated chamber by adjusting and measuring the position of each corner height.

Figure 10:
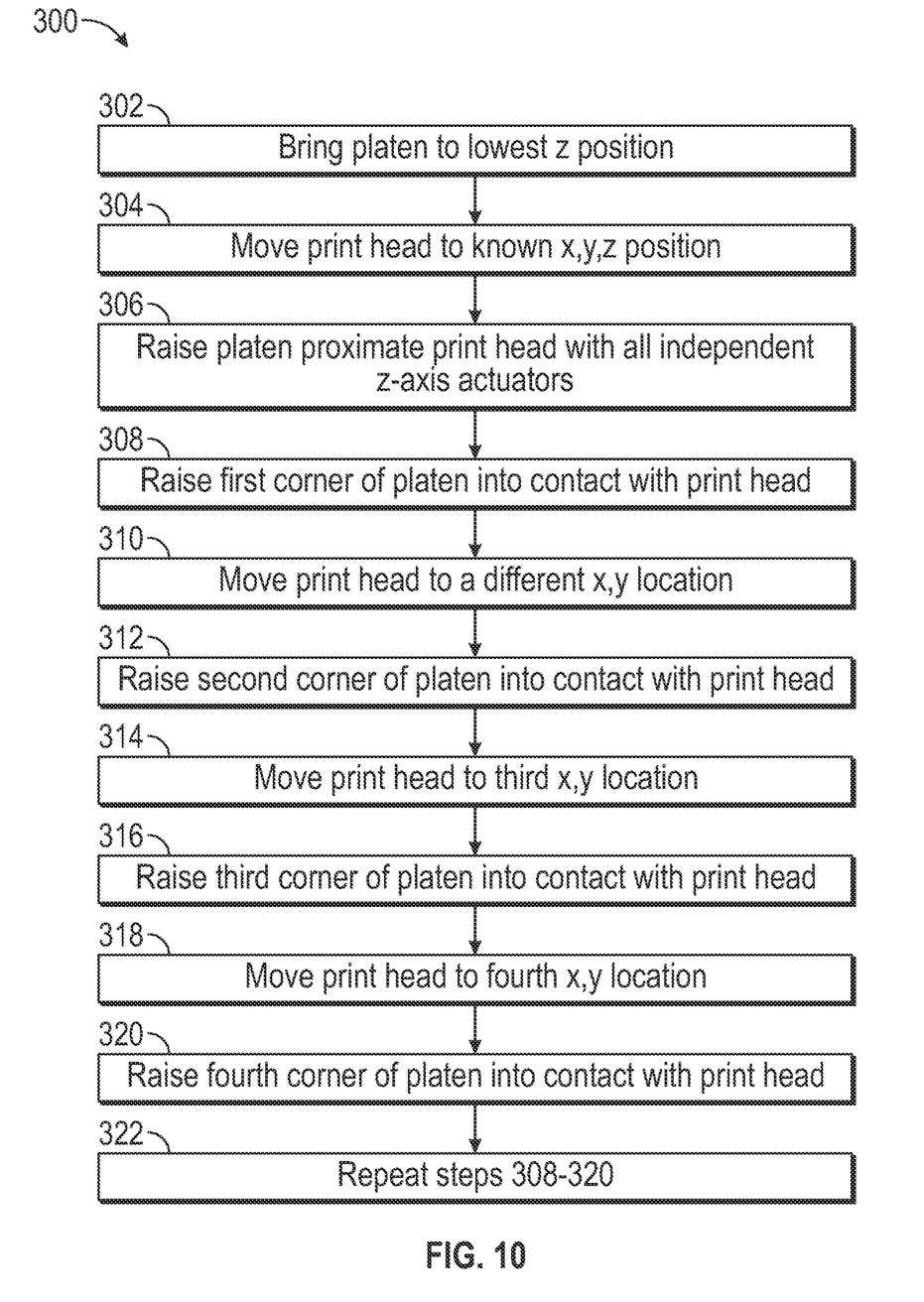
FIG. 10 is a flow chart of an automated platen leveling method of the present disclosure.

Referring to FIGS. 9 and 10, once the build chamber 28 and the platen 30 are heated to printing temperatures, a method for automatically leveling the platen 100 is conducted at 300. The method 300 includes, as preliminary steps, uniformly actuating the linear drives of z-axis actuators 130, 132, 134 and 136 to move the platen 100 downward until bumpers 145 (illustrated in FIGS. 5-7) extending from the bottom wall 147 of the mounting brackets 146 engage stops in known locations that extend from the outer surface of the build chamber 28 at step 302. The print head 18 with the nozzle tip 14 is then moved to a known location A in the z-direction utilizing where the location is determined using the linear encoder 204 at step 304. The platen 30 is then raised (again by uniformly actuating the linear drives) to a position proximate the print head 18 at step 306.

The platen 30 is then leveled by separately actuating each of the linear drives to raise each corner of the platen 30 until the platen build surface 100 contacts the nozzle tip 14 of the print head 18. At step 308, the z-axis actuator 130 is independently actuated while the z-axis actuators 132, 134 and 136 remain unactuated such that corner 102a of the platen 30 proximate the z-axis actuator 130 is raised until contact is made between the build surface 100 and the nozzle tip 14. The contact between the build surface 100 and the nozzle tip 14 is sensed by the linear encoder 204 which causes the z-axis actuator 130 to stop moving the platen 30. As the z-axis actuator 130 is moved, the pivot block 190 pivots about the pin 172 relative to the mounting bracket 146 and the x-direction beam 108 pivots about the pin 176 relative to the pivot block 190. The use of the pin couplings allows the platen 100 and the x-direction beams 108 and 110 to flex as necessary without imparting additional stress on the platen 30 or causing excessive loads on the motors 170 during the leveling process. Further, the use of y-direction fixed pin joints on one end of the platen 30 and floating pin joints at the other end of the platen allows the platen to thermally expand the length of the slots 122 and contract in the x direction as the platen 30 heats and cools which prevents the platen 30 from warping or twisting during the heating and cooling process.

The print head 18 is moved diagonally in the x-y plane to a location B proximate corner 104b of the platen 30 such that the nozzle tip 14 is in another known location in the z-direction at step 310. The z-actuator 134 is then actuated upwardly until contact is made between the build surface 100 and the nozzle tip 14 at step 312. Once contact is sensed, the z-actuator 134 is deactivated. As the z-axis actuators 134 is moved, the pivot block 190 pivots about the pin 172 relative to the mounting bracket 146 and the x-direction beam 110 pivots about the pin 190 relative to the pivot block 190.

The print head 18 is then moved in the y-direction towards a location C proximate corner 102b of the build surface 100 proximate the z-actuator 136 at step 314 where the x direction position is aligned with the x direction position of location A and the y direction position is aligned with the y direction location of point B at step 316. With the z-direction location of the nozzle tip 14 known, the z-actuator 136 is used to raise the platen 30 until build surface 100 contacts the nozzle tip 14 at step 312. Once contact is sensed, the z-actuator 136 is deactivated.

The print head 18 is the moved in the x-y plane diagonally to corner 104a of the platen 30 proximate the z-actuator 132 to point D at step 318, where the x direction position is aligned with the x direction position of location B and the y direction position is aligned with the y direction location of point A. With the z-direction location of the nozzle tip 14 known, the z-actuator 132 is used to raise the build surface 100 of platen 30 into contact with the nozzle tip 14 at step 320. Once contact is sensed, the z-actuator 132 is deactivated.

At step 322, the steps 308-320 are repeated to ensure the build surface 100 of platen 30 is substantially level. Utilizing the disclosed apparatus and method, large scale platens 30 can be leveled to within 10 μm, and more preferably within about 5 μm and even more preferably within about 1 μm.

While the leveling method using the z-actuators 310, 314, 312 and 316 is illustrated and described, other orders of actuating the z-actuators 310, 312, 314, and 316 to level the platen 30 are within the scope of the present disclosure.

Once the platen 30 has been leveled per the method 300, the encoders 172 are zeroed out. Once the encoders 172 are zeroed, the z-axis actuators 130, 132, 134 and 136 are moved downwardly a thickness of a layer, which maintains the platen as being level, until the 3D part or parts are printed.

Although the present disclosure has been described with reference to preferred embodiments, workers skilled in the art will recognize that changes may be made in form and detail without departing from the spirit and scope of the disclosure.

The invention claimed is:

1. A 3D printer comprising:
a heated build chamber;
a print head having a nozzle tip;
a platen within the heated build chamber and movable in a z-direction along a vertical print axis, the platen having a generally flat upward-facing build surface;
a first platen beam attached to the platen and having first and second platen arms proximate first and second corner locations of the platen;
a second platen beam attached to the platen and having third and fourth platen arms proximate third and fourth corner locations of the platen, each of the first, second, third and fourth arms extending beyond the build surface in the x-direction;
a z-lift and leveling assembly comprising:
first, second, third and fourth linear drives, each linear drive proximate a corner location of the platen, each of the first, second, third and fourth linear drives comprising:
a vertical rod secured within the printer;
a translating member configured to move up and down along a length of the rod under control of a driver; and
the driver configured to actuate motion of the translating member in response to commands from a controller;
first, second, third and fourth mounting brackets secured to the translating member of each linear drive and configured to travel with the associated translating member along the vertical rod when the linear drive is actuated; and
a set of four pin couplings, each set of pin couplings associated with one of the first, second, third and fourth linear drives, each pin coupling comprising:
a pivot block coupled to the mounting bracket;
a pivot pin set comprising an x-direction pin forming a first pin joint between the mounting bracket and the pivot block, and a y-direction pin forming a second pin joint between the pivot block and one of the first, second, third and fourth platen arms, wherein the x-direction pin and the y-direction pin are orthogonal to each other,
wherein the first pin joint for each of the first, second, third and fourth linear drives comprises a fixed pin joint,
wherein the second pin joint of the first and second linear drives comprises a fixed pin joint on a first end of the platen, and
wherein the second pin joint of the third and fourth linear drives comprises a floating pin joint on a second end of the platen, opposite the first end of the platen, each such floating pin joint being configured to accommodate thermal expansion and contraction of the platen in the x-y plane; and
wherein as the mounting bracket is moved, the pivot block moves relative to the mounting bracket about the first pin joint, the pivot block moves relative to the first or second platen support beams about the second pin joint, such that the platen can be manipulated to and maintained in a substantially level configuration in the z-direction through the independent manipulation of the first, second, third and fourth linear drives and wherein the substantially level configuration can be maintained when the platen is incremented in the z-direction during printing of a part.

2. The 3D printer of claim 1, wherein the z-lift and leveling assembly further comprises:
a set of four guide rails each associated with one of the linear drives, the guide rails mounted in parallel to and alongside of one of the linear drives; and
a guide bearing fixedly coupled to each of the mounting brackets and slidably coupled to the guide rail associated with the linear drive to which each of the mounting brackets is secured;
wherein the guide rails provide lateral support for the mounting brackets as they travel up and down.

3. The 3D printer of claim 1, and further comprising:
a gantry configured to move the print head in a x-y plane; and
a local z-direction sensor configured to sense a z position of the nozzle tip.

4. The 3D printer of claim 1, wherein each of the first, second, third and fourth linear drives each comprises a sensor configured sense a height of the mounting bracket.

5. The 3D printer of claim 1, wherein the vertical rod comprises a ball screw or lead screw and the translating member is a ball bearing or nut threadably engaged therewith, and the driver comprises a motor that is configured to rotate the ball screw or lead screw to cause the mounting bracket to move in the z-direction.

6. The 3D printer of claim 5, and further comprising an encoder configured to sense rotation of the motor and send a signal to a controller to determine a z-position of the mounting bracket.

7. The 3D printer of claim 1, wherein the first platen beam comprises a first x-direction support beam attached proximate an outer edge of the platen, and the second platen beam comprises a second x-direction support beam attached proximate an opposite outer edge of the platen a distance from the first platen support beam, wherein each of the first and second x-direction support beams have opposing ends that extend beyond edges of the build surface forming the arms.

8. The 3D printer of claim 3, wherein the local z-direction sensor comprises a linear sensor.

9. A z-lift and leveling assembly for leveling a platen in a heated chamber of a 3D printer, the platen leveling assembly comprising:
first, second, third, and fourth z-actuators in a rectangular configuration, each comprising:
a linear drive configured to supply motion in the z-direction; and
a mounting bracket secured to the linear drive and configured to move with the linear drive in the z-direction;
a set of four pin couplings each associated with one of the first, second, third and fourth z-actuators, each pin coupling comprising:
a pivot block secured to the mounting bracket with a first pivot pin forming a first pin joint between the mounting bracket and the pivot block wherein the pivot block is configured to move relative to the mounting bracket about a first pivot axis of the first pivot pin, wherein the pivot block is secured to the platen or an arm of the platen with a second pivot pin forming a second pin joint such that the pivot block and the platen move relative to each other about a second pivot axis;

wherein as the mounting bracket is moved, the pivot block moves relative to the mounting bracket about the first pivot axis and the pivot block moves relative to the platen about the second pivot axis such that a z-position of the platen can be manipulated to and maintained in a substantially level configuration in the z-direction though the independent manipulation of the first, second, third and fourth z-actuators and wherein the substantially level configuration can be maintained when the platen is incremented in the z-direction during printing of a part.

10. The z-lift and leveling assembly of claim 9, and further comprising a sensor configured sense a height of the mounting bracket.

11. The z-lift and leveling assembly of claim 9, wherein the linear drive comprises:
- a threaded nut non-movably secured to the mounting bracket to which the mounting bracket is secured;
- a threaded rod threadably engaging the threaded nut; and
- a motor configured to rotate the threaded rod to cause the mounting bracket to move in the z-direction.

12. The z-lift and leveling assembly of claim 9, and further comprising an encoder configured to sense rotation of the motor and send a signal to a controller to determine a z-position of the mounting bracket.

13. The z-lift and leveling assembly of claim 9, wherein the first and second pivot axes are orthogonal to each other.

14. The z-lift and leveling assembly of claim 9, wherein the first pivot joint comprises a fixed pivot joint.

15. The z-lift and leveling assembly of claim 9, wherein the second pivot joint comprises a fixed pivot joint or a floating pivot joint.

* * * * *